(12) United States Patent
Hunt et al.

(10) Patent No.: US 9,244,193 B2
(45) Date of Patent: Jan. 26, 2016

(54) MICROSTRUCTURED OPTICAL FILMS COMPRISING FLUORENE-CONTAINING MONOMER

(71) Applicant: 3M INNOVATIVE PROPERTIES COMPANY, St. Paul, MN (US)

(72) Inventors: Bryan V. Hunt, Nowthen, MN (US); Eric W. Nelson, Stillwater, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 223 days.

(21) Appl. No.: 13/911,336

(22) Filed: Jun. 6, 2013

(65) Prior Publication Data

US 2013/0266763 A1 Oct. 10, 2013

Related U.S. Application Data

(63) Continuation of application No. 13/125,190, filed as application No. PCT/US2009/068444 on Dec. 17, 2009, now Pat. No. 8,530,595.

(60) Provisional application No. 61/139,691, filed on Dec. 22, 2008.

(51) Int. Cl.
| | |
|---|---|
| *G02B 1/04* | (2006.01) |
| *C08F 265/04* | (2006.01) |
| *C08F 289/00* | (2006.01) |
| *C08F 290/06* | (2006.01) |
| *C08F 291/00* | (2006.01) |
| *C08L 51/00* | (2006.01) |
| *C08L 51/08* | (2006.01) |
| *C09D 151/00* | (2006.01) |
| *C09D 151/08* | (2006.01) |

(52) U.S. Cl.
CPC ............... *G02B 1/04* (2013.01); *C08F 265/04* (2013.01); *C08F 289/00* (2013.01); *C08F 290/06* (2013.01); *C08F 291/00* (2013.01); *C08L 51/003* (2013.01); *C08L 51/08* (2013.01); *C09D 151/003* (2013.01); *C09D 151/08* (2013.01); *Y10T 428/24355* (2015.01)

(58) Field of Classification Search
CPC .... C08F 265/04; C08F 289/00; C08F 290/06; C08F 291/00; C08L 51/003; C08L 51/08; C09D 151/003; C09D 151/08; G02B 1/04; Y10T 428/24355
USPC .......................................... 526/259; 428/141
See application file for complete search history.

(56) References Cited

U.S. PATENT DOCUMENTS

| | | | |
|---|---|---|---|
| 4,576,850 A | 3/1986 | Martens | |
| 5,175,030 A | 12/1992 | Lu | |
| 5,183,597 A | 2/1993 | Lu | |
| 5,783,120 A | 7/1998 | Ouderkirk | |
| 5,825,543 A | 10/1998 | Ouderkirk | |
| 5,828,488 A | 10/1998 | Ouderkirk | |
| 5,932,626 A | 8/1999 | Fong | |
| 6,111,696 A | 8/2000 | Allen | |
| 6,777,070 B1 | 8/2004 | Murata | |
| 6,953,623 B2 | 10/2005 | Olson | |
| 7,074,463 B2 | 7/2006 | Jones | |
| 7,124,651 B2 | 10/2006 | Ketola | |
| 7,241,437 B2 * | 7/2007 | Davidson et al. | 423/608 |
| 7,586,566 B2 | 9/2009 | Nelson | |
| 2004/0241469 A1 | 12/2004 | McMan | |
| 2005/0100722 A1 | 5/2005 | Kitamura | |
| 2005/0148739 A1 | 7/2005 | Hara | |
| 2006/0122349 A1 | 6/2006 | Mentak | |
| 2006/0141220 A1 * | 6/2006 | Merrill et al. | 428/156 |
| 2006/0255791 A1 | 11/2006 | Messing | |
| 2006/0274237 A1 | 12/2006 | Nelson | |
| 2007/0014009 A1 | 1/2007 | Cross | |
| 2008/0084609 A1 | 4/2008 | Lin | |
| 2009/0197986 A1 * | 8/2009 | Lee et al. | 522/6 |

FOREIGN PATENT DOCUMENTS

| | | |
|---|---|---|
| CN | 101189546 | 5/2010 |
| JP | 58-132039 | 8/1983 |
| JP | 04-106161 | 4/1992 |
| JP | 4-142315 | 5/1992 |
| JP | 6-73368 | 3/1994 |
| JP | 9-254345 | 9/1997 |
| JP | 2002-275285 | 9/2002 |
| JP | 2004-244606 | 9/2004 |
| JP | 2006-152115 | 6/2006 |
| JP | 2008-094987 | 4/2008 |
| WO | 2006/080813 | 8/2006 |
| WO | 2006/132913 | 12/2006 |
| WO | 2007/059228 | 5/2007 |
| WO | 2008/112451 | 9/2008 |
| WO | 2008/112452 | 9/2008 |
| WO | 2008/121465 | 10/2008 |
| WO | 2008/150081 | 12/2008 |

OTHER PUBLICATIONS

Ciba Specialty Chemicals; Coating Effects Segment, Ciba® TINUVIN® R 796, Reactable UV Absorber (2001).*
International Search Report PCT/US2009/06844 Feb. 5, 2010, 4 pages.
Ciba Specialty Chemicals; Coating Effects Segment, Ciba® TINUVIN® R 796, Reactable UV Absorber (2001) 2 pgs.
"UV/Light Stabilizers Center-Hindered Amine Stabilizers" Special Chem, [retrieved from the internet Dec. 11, 2008] URL <http://www.specialchem4adhesives.com/tc/us-light-stabilizers/index.aspx?id=hals>, 2 pgs.

* cited by examiner

*Primary Examiner* — Ling Choi
*Assistant Examiner* — Chun-Cheng Wang
(74) *Attorney, Agent, or Firm* — Carolyn A. Fischer

(57) ABSTRACT

Polymerizable resin compositions and microstructures comprising the reaction product of such polymerizable resin compositions are described. The microstructures comprise the reaction product of a polymerizable resin composition comprising an organic portion having a refractive index of at least 1.56 wherein the polymerizable resin composition comprises a fluorene-containing monomer.

20 Claims, No Drawings

MICROSTRUCTURED OPTICAL FILMS COMPRISING FLUORENE-CONTAINING MONOMER

BACKGROUND

Certain microreplicated optical products, such as described in U.S. Pat. Nos. 5,175,030 and 5,183,597, are commonly referred to as "brightness enhancing films".

Brightness enhancing films are currently used in various (e.g. LCD) hand-held display devices, such as cell phones, PDAs, and MP3 players, to increase battery life and display brightness.

U.S. Pat. No. 7,586,566 describes a brightness enhancing film suitable for use in a display device is disclosed herein. The film comprises a first polymeric layer having a microstructured surface, wherein the microstructured surface comprises an array of prism elements, and a second polymeric layer disposed adjacent to the first polymeric layer on the opposite side of the microstructured surface, wherein at least one of the first and second polymeric layers comprises a UV absorber that absorbs UV light and transmits visible light, such that the brightness enhancing film has an internal percent transmission of at least 95% at 410 nm, and at most 25% at 380 nm. Also disclosed herein is a brightness enhancing film wherein the UV absorber is in a third layer disposed between the first and second layers. The brightness enhancing films may be used in display devices such as LCD-TVs.

SUMMARY

In some embodiments, microstructured films comprising a polymerized microstructured surface are described. In one embodiment, the microstructures comprise the reaction product of a polymerizable resin composition comprising an organic portion having a refractive index of at least 1.56 wherein the polymerizable resin composition comprises a polymerizable fluorene-containing monomer.

DETAILED DESCRIPTION

Presently described are polymerizable resin compositions for use in making microstructured optical film articles, especially brightness enhancing films. The microstructured (e.g. brightness enhancing) films described herein comprise a polymerized microstructured surface wherein the microstructures comprise the reaction product of a polymerizable resin composition comprising a polymerizable ultraviolet absorbing compound.

The ultraviolet absorbing compound typically comprises a core structure comprising an ultraviolet absorbing group. The ultraviolet absorbing compound further comprises one or more substituents bonded to the core structure. At least one of the substituents comprises a (meth)acrylate end group. The ultraviolet absorbing compound is typically a mono(meth)acrylate compound, having a single polymerizable (meth)acrylate group.

The polymerizable ultraviolet absorbing compound can be represented by the general UVA-L$_v$-A wherein UVA represents an ultraviolet absorbing group, Lv is a linking group covalently bonding UVA to A, and A is a (meth)acrylate group represented by

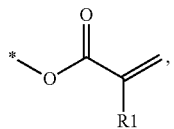

wherein R1 is methyl or H.

Various ultraviolet absorbing compounds are commercially available including for example hydroxy-benzophenone, hydroxy-phenyl-benzotriazole, or hydroxy-phenyl-triazine. The aromatic rings of the hydroxy-benzophenone, hydroxy-phenyl-benzotriazole, or hydroxy-phenyl-triazine core structure may optionally further comprise various substituents, as known in the art. For example, the core structure may comprise one or more (e.g. $C_1$ to $C_4$) alkyl groups optionally containing an ether linkage(s) or hydroxyl group(s).

Several starting compounds are commercially available or have been described in the literature having a polymerizable hydroxyl group (—OH) that can be reacted with acrylochloride for example to convert a hydroxyl group to a substituent having a (meth)acrylate group.

The hydroxyl-benzophenone ultraviolet absorbing groups can be represented by the general core structure:

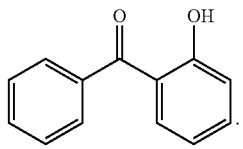 [SMILES: O=C(c1ccccc1)c1ccccc1O]

One suitable polymerizable benzophenone ultraviolet absorbing compound that has been found to be suitable is 1,2-(4-benzoyl-3-hydroxyphenoxy)ethyl acrylate, depicted as follows:

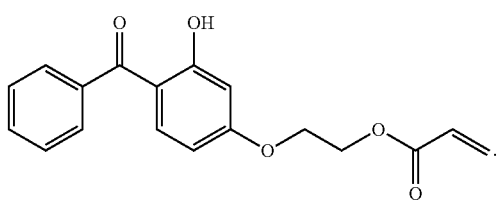 [SMILES: C=CC(=O)OCCOc1ccc(C(=O)c2ccccc2)c(O)c1]

This polymerizable ultraviolet absorbing compound is commercially available from Aldrich.

Another representative polymerizable hydroxyl-benzophenone ultraviolet absorbing compound is

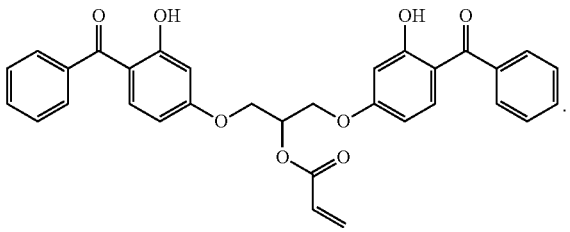 [SMILES: C=CC(=O)OC(COc1ccc(C(=O)c2ccccc2)c(O)c1)COc1ccc(C(=O)c2ccccc2)c(O)c1]

This polymerizable ultraviolet absorbing compound is commercially available from Monomer-Polymer & Dajac Laboratories, Inc.

The hydroxy-phenyl-benzotriazole ultraviolet absorbing groups can be represented by the general core structure:

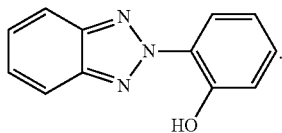 [SMILES: Oc1ccccc1-n1nc2ccccc2n1]

One suitable polymerizable hydroxy-phenyl-benzotriazole ultraviolet absorbing compound that has been found to be suitable is 2,2-[3-(2H-benzotriazol-2-yl)-4-hydroxyphenyl] ethyl methacrylate, depicted as follows:

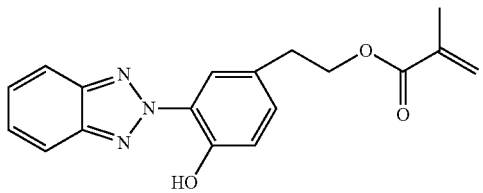 [SMILES: C=C(C)C(=O)OCCc1ccc(O)c(-n2nc3ccccc3n2)c1]

This polymerizable ultraviolet absorbing compound is commercially available from Aldrich and also from Ciba under the trade designation "Tinuvin R 796".

The hydroxy-phenyl-benzotriazine ultraviolet absorbing groups can be represented by the general formula:

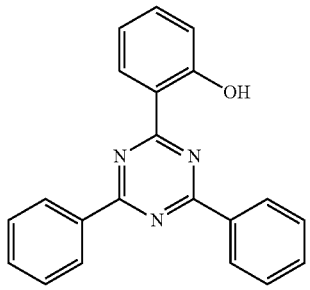

One representative polymerizable hydroxy-phenyl-benzotriazine ultraviolet absorbing compound is depicted as follows:

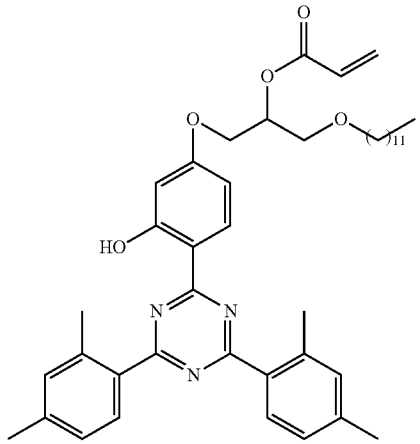

This polymerizable ultraviolet absorbing compound could be readily prepared from the following precursor that is commercially available from Ciba Specialty Chemicals Corp., Additives Division.

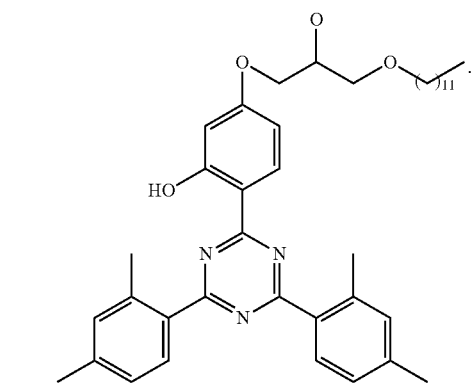

The polymerizable ultraviolet absorbing compound is added to the polymerizable resin composition is an amount of at least 0.5, 1.0, 1.5, or 2 wt-%. When the polymerizable ultraviolet absorbing compound has high refractive index, (e.g. of at least 1.58) the amount of polymerizable ultraviolet absorbing compound can range up to as much as 20 wt-%. Typically, however, the polymerizable ultraviolet absorbing compound is added at a sufficient, but minimal concentration to reduce the yellowness that would otherwise occur after extended exposure to ultraviolet. The concentration of polymerizable ultraviolet absorbing compound is typically no greater than about 10 wt-% and more typically no greater than about 5 wt-%.

The polymerizable resin may optionally further comprise a light stabilizer, such as a hindered amine light stabilizer (HALS). Such compounds are typically derivatives of 2,2,6,6,-tetramethyl piperidine. One preferred HALS is commercially available from Ciba under the trade designation "Tinuvin 152", having the following structure.

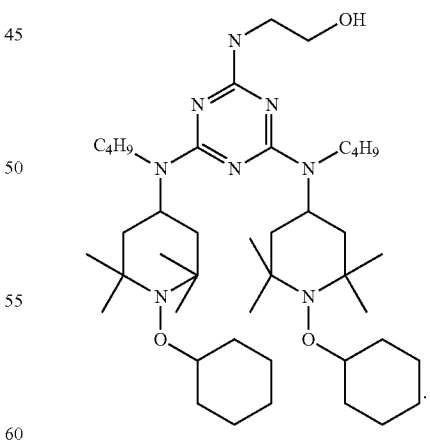

However, the polymerizable resin preferably comprises no greater than 1% by weight of non-polymerizable additives other than photoinitiator. More preferably, the polymerizable resin is free of non-polymerizable additives other than photoinitiator and thus free of non-reactive components that can migrate to the film surface over time.

In some embodiments, the polymerizable resin composition is substantially free of inorganic nanoparticles. In this embodiment, the polymerizable resin composition and organic component are one in the same. In other embodiments, the polymerizable resin composition comprises surface modified inorganic nanoparticles. In such embodiments, "polymerizable composition" refers to the total composition, i.e. the organic component and surface modified inorganic nanoparticles.

The organic component and the polymerizable resin composition are preferably substantially solvent free. "Substantially solvent free" refer to the polymerizable composition having less than 5 wt-%, 4 wt-%, 3 wt-%, 2 wt-%, 1 wt-% and 0.5 wt-% of non-polymerizable (e.g. organic) solvent. The concentration of solvent can be determined by known methods, such as gas chromatography (as described in ASTM D5403). Solvent concentrations of less than 0.5 wt-% are preferred.

The components of the organic component are preferably chosen such that the polymerizable resin composition has a low viscosity. In some embodiments, the viscosity of the organic component is less than 1000 cps and typically less than 900 cps at the coating temperature. The viscosity of the organic component may be less than 800 cps, less than 700 cps, less than 600 cps, or less than 500 cps at the coating temperature. As used herein, viscosity is measured (at a shear rate up to 1000 sec-1) with 25 mm parallel plates using a Dynamic Stress Rheometer. Further, the viscosity of the organic component is typically at least 10 cps, more typically at least 50 cps at the coating temperature.

The coating temperature typically ranges from ambient temperature, 77° F. (25° C.) to 180° F. (82° C.). The coating temperature may be less than 170° F. (77° C.), less than 160° F. (71° C.), less than 150° F. (66° C.), less than 140° F. (60° C.), less than 130° F. (54° C.), or less than 120° F. (49° C.). The organic component can be a solid or comprise a solid component provided that the melting point in the polymerizable composition is less than the coating temperature. The organic components described herein are preferably liquids at ambient temperature.

The organic component has a refractive index of at least 1.54, 1.55, 1.56, 1.57, 1.58, 1.59, 1.60, 1.61, or 1.62. The polymerizable composition including high refractive index nanoparticles can have a refractive index as high as 1.70. (e.g. at least 1.61, 1.62, 1.63, 1.64, 1.65, 1.66, 1.67, 1.68, or 1.69). High transmittance in the visible light spectrum is also typically preferred.

The polymerizable composition is energy curable in time scales preferably less than five minutes (e.g. for a brightness enhancing film having a 75 micron thickness). The polymerizable composition is preferably sufficiently crosslinked to provide a glass transition temperature that is typically greater than 45° C. The glass transition temperature can be measured by methods known in the art, such as Differential Scanning Calorimetry (DSC), modulated DSC, or Dynamic Mechanical Analysis. The polymerizable composition can be polymerized by conventional free radical polymerization methods.

As described for example in U.S. Pat. No. 5,932,626, one important property of an optical material is its index of refraction, because index of refraction is related to how effectively an optical material can control the flow of light. There exists a continuing need for optical materials and optical products that exhibit a high index of refraction. With respect specifically to brightness enhancement films, the index of refraction is related to the brightness gain or "gain" produced by the brightness enhancement film. Gain is a measure of the improvement in brightness of a display due to the brightness enhancement film, and is a property of the optical material (e.g., its index of refraction), and also of the geometry of the brightness enhancement film; as gain increases viewing angle will typically decrease. A high gain is desired for a brightness enhancement film because improved gain provides an effective increase in the brightness of a backlit display. Improved brightness means that the electronic product can operate more efficiently by using less power to light the display, thereby reducing power consumption, placing a lower heat load on its components, and extending the lifetime of the product. Thus, because of these advantages, there exists a continuing need to find optical products to provide improved levels of brightness gain, with even very small, seemingly incremental improvements being quite significant.

One way to increase the refractive index of a polymerizable resin composition is to employ various brominated (meth) acrylate monomers, as described in the art. However, the polymerizable resin compositions described herein are preferably non-brominated, meaning that the polymerizable components utilized do not comprise bromine substituents. In some embodiments, the polymerizable resin compositions are non-halogenated. However, a detectable amount, i.e. less than 1 wt-% (as measured according to Ion Chromatography) of (e.g. bromine) halogen may be present as a contaminant.

Although polymerizable ultraviolet absorbing compound can be added to most any polymerizable resin composition, it has been found that the addition of such compounds substantially benefits polymerizable resin composition comprising certain classes of high refractive index (meth)acrylate monomers that are particularly susceptible to yellowing. In some embodiments, aromatic (meth)acrylate monomers and oligomers particularly susceptible to yellowing can be characterized as having a refractive index of least 1.585.

The yellowness of the microstructured (e.g. brightness enhancing) optical film can be determined by measuring the change in yellowness, or $\Delta b^*$, as is known in the CIE L*a*b* color space, developed by the Commission Internationale de l'Eclairage in 1976. A widely used method for measuring and ordering color, CIE L*a*b* color space is a three-dimensional space in which a color is defined as a location in the space using the terms L, *, a*, and b*. L* is a measure of the lightness of a color and ranges from zero (black) to 100 (white) and may be visualized as the z-axis of a typical three-dimensional plot having x-, y- and z-axes. The terms a* and b* define the hue and chroma of a color and may be visualized as the x- and y-axes, respectively. The term a* ranges from a negative number (green) to a positive number (red), and the term b* ranges from a negative number (blue) to a positive number (yellow). Thus, b*, as used herein, relates to the yellowness of an article. For a complete description of color measurement, see "Measuring Color", 2nd Edition by R. W. G. Hunt, published by Ellis Horwood Ltd., 1991. In general, b* for the brightness enhancing film is no greater than 2.5, otherwise it appears too yellow.

One class of monomers that has been found to be particularly susceptible to yellowing are fluorene-containing monomers. One particular fluorene-containing (meth)acrylate monomer that has been described for use as a high refractive index reactive diluent is 9,9-bis[4-(2-acryloyloxyethoxy) phenyl]fluorene (NK Ester A-BPEF), available from Shin-Nakamura. The structure of this monomer is shown as follows:

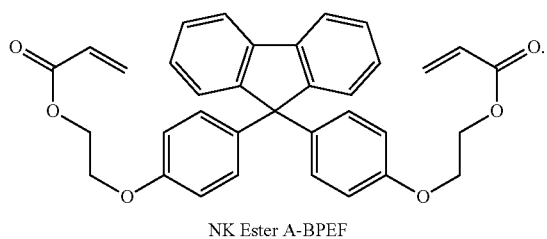 [SMILES: C=CC(=O)OCCOc1ccc(C2(c3ccc(OCCOC(=O)C=C)cc3)c3ccccc3-c3ccccc32)cc1]

NK Ester A-BPEF

Another class of monomers that have been found to be particularly susceptible to yellowing are naphthyl-containing aromatic monomers. One particular naphthyl-containing (meth)acrylate monomer that has been described for use as a high refractive index reactive diluent is 2-(1-napthyloxy)-1-ethyl acrylate, as described in U.S. Pat. No. 6,953,623. The structure of this monomer is shown as follows:

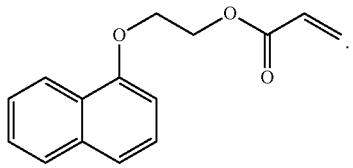 [SMILES: C=CC(=O)OCCOc1cccc2ccccc12]

Other naphthyl-containing (meth)acrylate monomers include for example 2-naphthylthio ethyl acrylate; 1-naphthylthio ethyl acrylate; and naphthyloxy ethyl acrylate.

Another class of monomers that have been found to be particularly susceptible to yellowing are sulfur-containing aromatic monomers and oligomers.

The polymerizable resin comprises a mixture of ethylenically unsaturated components. The mixture includes a major amount of at least one difunctional aromatic (meth)acrylate monomer or oligomer and at least one monfunctional aromatic (meth)acrylate diluent.

The polymerizable UV absorber is particularly useful when the di(meth)acrylate monomer is a sulfur-containing aromatic monomer, a napthyl-containing aromatic monomer, a fluorene-containing monomer, or mixture thereof. Alternatively, the polymerizable UV absorber is also particularly useful when the di(meth)acrylate monomer is free of such groups that are highly susceptible to yellowing, yet the polymerizable resin comprises a mono(meth)acrylate monomer that is a sulfur-containing aromatic monomer, a napthyl-containing aromatic monomer, a fluorene-containing monomer, or mixture thereof. Further, the polymerizable UV absorber is also particularly when the polymerizable resin comprises both a di(meth)acrylate monomer and mono(meth)acrylate monomer, each containing groups that are susceptible to yellowing.

The (meth)acrylate diluent has a lower molecular weight and thus a substantially lower viscosity than that of the di(meth)acrylate component, i.e. less than 300 cps at 25° C. In some embodiments, the viscosity of the (meth)acrylate diluent is less than 250 cps, 200 cps, 150 cps, 100 cps, or 50 cps at 25° C. The inclusion of one or more (meth)acrylate diluents improves the processability by reducing the viscosity of the polymerizable resin composition allowing for faster filling of the cavities of the microstructured tool.

In some embodiments, the aromatic monomer is a bisphenol di(meth)acrylate, i.e. the reaction product of a bisphenol A diglycidyl ether and acrylic acid. Although, bisphenol A is most widely available, it is appreciated that other bisphenol diglycidyl ethers, such as bisphenol F digycidyl could also be used. In other embodiments, the monomer is an aromatic epoxy di(meth)acrylate oligomer derived from a different starting monomer.

Regardless of the starting monomers, the polymerizable composition preferably comprises at least one aromatic difunctional (meth)acrylate monomer.

In some embodiments the difunctional (meth)acrylate monomer is a fluorene-containing monomer, such as previously described.

In other embodiments, the difunctional (meth)acrylate monomer that comprises a major portion having the following general structure:

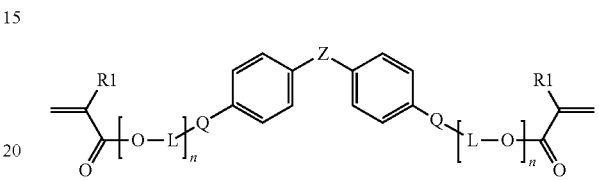

wherein Z is independently —C(CH$_3$)$_2$—, —CH$_2$—, —C(O)—, —S—, —S(O)—, or —S(O)$_2$—, each Q is independently O or S. L is a linking group. L may independently comprise a branched or linear $C_2$-$C_6$ alkyl group and n ranges from 0 to 10. More preferably L is $C_2$ or $C_3$ and n is 0, 1, 2 or 3. The carbon chain of the alkyl linking group may optionally be substituted with one or more hydroxy groups. For example L may be —CH$_2$CH(OH)CH$_2$— Typically, the linking groups are the same. R1 is independently hydrogen or methyl.

The di(meth)acrylate monomer may be synthesized or purchased. As used herein, major portion refers to at least 50-75 wt-% of the monomer containing the specific structure(s) just described. It is commonly appreciated that other reaction products are also typically present as a byproduct of the synthesis of such monomers.

Preferred di(meth)acrylate aromatic epoxy oligomers and bisphenol di(meth)acrylate monomers, described herein, have a molecular weight (i.e. the calculated molecular weight of the major molecule) greater than 450 g/mole. Typically the molecular weight is less than 1600 g/mole.

In other embodiments, the difunctional (meth)acrylate monomer is a triphenyl monomer such as described in WO2008/112452; incorporated herein by reference.

For embodiments wherein the polymerizable resin composition is substantially free of inorganic nanoparticles, the polymerizable resin composition typically comprises one or more of such monomers in an amount of at least 50 wt-%. For embodiments wherein the polymerizable resin composition further comprises substantial amount of inorganic nanoparticles, the organic component typically comprises at least 5 wt-% and no greater than about 20 wt-% of di(meth)acrylate monomer. The polymerizable resin composition may comprise a single bisphenol di(meth)acrylate monomer, two or more bisphenol di(meth)acrylate monomer(s), a single aromatic epoxy di(meth)acrylate oligomer, two or more aromatic epoxy di(meth)acrylate oligomers, as well as various combinations of at least one bisphenol di(meth)acrylate in combination with at least one aromatic epoxy di(meth)acrylate.

In some embodiments, the polymerizable resin composition comprises at least 65 wt-% (66 wt-%, 67 wt-%, 68 wt-%, 69 wt-%), at least 70 wt-% (71 wt-%, 72 wt-%, 73 wt-%, 74 wt-%), or at least 75 wt-% of such di(meth)acrylate) monomer(s) and/or oligomer(s).

Various (meth)acrylated aromatic epoxy oligomers are commercially available. For example, (meth)acrylated aromatic epoxy, (described as a modified epoxy acrylates), are available from Sartomer, Exton, Pa. under the trade designation "CN118", and "CN115". (Meth)acrylated aromatic epoxy oligomer, (described as an epoxy acrylate oligomer), is available from Sartomer under the trade designation "CN2204". Further, a (meth)acrylated aromatic epoxy oligomer, (described as an epoxy novolak acrylate blended with 40% trimethylolpropane triacrylate), is available from Sartomer under the trade designation "CN112C60". One exemplary aromatic epoxy acrylate is commercially available from Sartomer under the trade designation "CN 120" (reported by the supplier to have a refractive index of 1.5556, a viscosity of 2150 at 65° C., and a Tg of 60° C.).

One exemplary bisphenol A ethoxylated diacrylate monomer is commercially available from Sartomer under the trade designations "SR602" (reported to have a viscosity of 610 cps at 20° C. and a Tg of 2° C.). Another exemplary bisphenol A ethoxylated diacrylate monomer is as commercially available from Sartomer under the trade designation "SR601" (reported to have a viscosity of 1080 cps at 20° C. and a Tg of 60° C.).

For embodiments wherein the polymerizable resin composition is substantially free of inorganic nanoparticles, the total amount of (meth)acrylate diluent(s) can be at least 5 wt-%, 10 wt-%, 15 wt-%, 20 wt-%, or 25 wt-% of the polymerizable composition. The total amount of (meth)acrylate diluents(s) is typically no greater than 40 wt-%, and more typically no greater than about 35 wt-%. For embodiments wherein the polymerizable resin composition further comprises substantial amount of inorganic nanoparticles, the total amount of (meth)acrylate diluent(s) of the organic component can range up to 90 wt-%, but it typically no greater than 75 wt-%.

In some embodiments, a multi-functional (meth)acrylate component may be employed as a diluent. For example, tetraethylene glycol diacrylate such as commercially available from Sartomer under the trade designation SR 268 has been found to be a suitable diluent. Other suitable multi-functional diluents include SR351, trimethylol propane triacrylate (TMPTA).

When one or more aromatic (e.g. monofunctional) (meth) acrylate monomer(s) are employed as the diluent, such diluent can concurrently raise the refractive index of the polymerizable resin composition. Suitable aromatic monofunctional (meth)acrylate monomers typically have a refractive index of at least 1.50, 1.51, 1.52, 1.53, 1.54, 1.55, 1.56, 1.57, 1.58 or 1.59.

Aromatic (e.g. monofunctional) (meth)acrylate monomers typically comprise a phenyl, biphenyl, cumyl, or naphthyl group.

Suitable monomers include phenoxyethyl(meth)acrylate; phenoxy-2-methylethyl(meth)acrylate; phenoxyethoxyethyl (meth)acrylate, 3-hydroxy-2-hydroxypropyl(meth)acrylate; benzyl(meth)acrylate; phenoxy 2-methylethyl acrylate; phenoxyethoxyethyl acrylate; 3-phenoxy-2-hydroxy propyl acrylate; and phenyl acrylate.

In some embodiments, the polymerizable compositions comprise one or more monofunctional biphenyl monomer(s).

Monofunctional biphenyl monomers comprise a terminal biphenyl group (wherein the two phenyl groups are not fused, but joined by a bond) or a terminal group comprising two aromatic groups joined by a linking group (e.g. Q). For example, when the linking group is methane, the terminal group is a biphenylmethane group. Alternatively, wherein the linking group is —(C(CH$_3$)$_2$—, the terminal group is 4-cumyl phenyl. The monofunctional biphenyl monomer(s) also comprise a single ethylenically unsaturated group that is preferably polymerizable by exposure to (e.g. UV) radiation. The monofunctional biphenyl monomer(s) preferably comprise a single (meth)acrylate group. Acrylate functionality is typically preferred. In some aspects, the biphenyl group is joined directly to the ethylenically unsaturated (e.g. (meth)acrylate) group. An exemplary monomer of this type is 2-phenyl-phenyl acrylate. The biphenyl mono(meth)acrylate or monomer may further comprise a (e.g. 1 to 5 carbon) alkyl group optionally substituted with one or more hydroxyl groups. An exemplary species of this type is 2-phenyl-2-phenoxyethyl acrylate.

In one embodiment, a monofunctional biphenyl(meth) acrylate monomer is employed having the general formula:

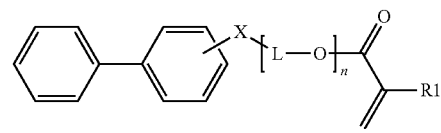

wherein R1 is H or CH$_3$;

X is O or S;

n ranges from 0 to 10 (e.g. n is 1, 2, 3, 4, 5, 6, 7, 8, 9, or 10); and

L is an alkyl group having 1 to 5 carbon atoms (i.e. methyl, ethyl, propyl, butyl, or pentyl), optionally substituted with hydroxy.

In another embodiment, the monofunctional biphenyl (meth)acrylate monomer has the general formula:

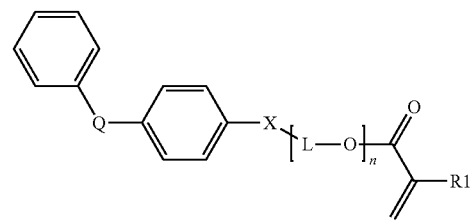

wherein R1 is H or CH$_3$;

X is O or S;

Q is selected from —(C(CH$_3$)$_2$—, —CH$_2$, —C(O)—, —S(O)—, and —S(O)$_2$—;

n ranges from 0 to 10 (e.g. n is 1, 2, 3, 4, 5, 6, 7, 8, 9, or 10); and

L is an alkyl group having 1 to 5 carbon atoms (i.e. methyl, ethyl, butyl, or pentyl), optionally substituted with hydroxy.

Some specific monomers that are commercially available from Toagosei Co. Ltd. of Japan, include for example 2-phenyl-phenyl acrylate available under the trade designation "TO-2344", 4-(-2-phenyl-2-propyl)phenyl acrylate available under the trade designation "TO-2345", ethoxylated p-cumylphenol acrylate available under the trade designation "M-110", and 2-phenyl-2-phenoxyethyl acrylate, available under the trade designation "TO-1463".

Various combinations of aromatic monofunctional (meth) acrylate monomers can be employed. For example, a (meth) acrylate monomer comprising a phenyl group may be employed in combination with one or more (meth)acrylate monomers comprising a biphenyl group. Further, two different biphenyl(meth)acrylate monomer may be employed.

The polymerizable resin may optionally comprise up to 35 wt-% of various other non-brominated or non-halogenated ethylenically unsaturated monomers. For example, when the (e.g. prism) structures are cast and photocured upon a polycarbonate preformed polymeric film the polymerizable resin composition may comprise one or more N,N-disubstituted (meth)acrylamide monomers. These include N-alkylacrylamides and N,N-dialkylacrylamides, especially those containing $C_{1-4}$ alkyl groups. Examples are N-isopropylacrylamide, N-t-butylacrylamide, N,N-dimethylacrylamide, N,N-diethylacrylamide, N-vinyl pyrrolidone and N-vinyl caprolactam.

The polymerizable resin composition may also optionally comprise up to 15 wt-% of a non-aromatic crosslinker that comprises at least three (meth)acrylate groups. Suitable crosslinking agents include for example pentaerythritol tri(meth)acrylate, pentaerythritol tetra(meth)acrylate, trimethylolpropane tri(methacrylate), dipentaerythritol penta(meth)acrylate, dipentaerythritol hexa(meth)acrylate, trimethylolpropane ethoxylate tri(meth)acrylate, glyceryl tri(meth)acrylate, pentaerythritol propoxylate tri(meth)acrylate, and ditrimethylolpropane tetra(meth)acrylate. Any one or combination of crosslinking agents may be employed. Since methacrylate groups tend to be less reactive than acrylate groups, the crosslinker(s) are preferably free of methacrylate functionality.

Various crosslinkers are commercially available. For example, pentaerythritol triacrylate (PETA) is commercially available from Sartomer Company, Exton, Pa. under the trade designation "SR444"; from Osaka Organic Chemical Industry, Ltd. Osaka, Japan under the trade designation "Viscoat #300"; from Toagosei Co. Ltd., Tokyo, Japan under the trade designation "Aronix M-305"; and from Eternal Chemical Co., Ltd., Kaohsiung, Taiwan under the trade designation "Etermer 235". Trimethylol propane triacrylate (TMPTA) is commercially available from Sartomer Company under the trade designations "SR351". TMPTA is also available from Toagosei Co. Ltd. under the trade designation "Aronix M-309". Further, ethoxylated trimethylolpropane triacrylate and ethoxylated pentaerythritol triacrylate are commercially available from Sartomer under the trade designations "SR454" and "SR494" respectively.

It is typically preferred, however, that the composition is substantially free (e.g. less than 1-2 wt-%) of (meth)acrylate monomer and oligomers that comprise three of more (meth)acrylate groups.

The UV curable polymerizable compositions comprise at least one photoinitiator. A single photoinitiator or blends thereof may be employed in the brightness enhancement film of the invention. In general the photoinitiator(s) are at least partially soluble (e.g. at the processing temperature of the resin) and substantially colorless after being polymerized. The photoinitiator may be (e.g. yellow) colored, provided that the photoinitiator is rendered substantially colorless after exposure to the UV light source.

Suitable photoinitiators include monoacylphosphine oxide and bisacylphosphine oxide. Commercially available mono or bisacylphosphine oxide photoinitiators include 2,4,6-trimethylbenzoybiphenylphosphine oxide, commercially available from BASF (Charlotte, N.C.) under the trade designation "Lucirin TPO"; ethyl-2,4,6-trimethylbenzoylphenyl phosphinate, also commercially available from BASF under the trade designation "Lucirin TPO-L"; and bis(2,4,6-trimethylbenzoyl)-phenylphosphine oxide commercially available from Ciba Specialty Chemicals under the trade designation "Irgacure 819". Other suitable photoinitiators include 2-hydroxy-2-methyl-1-phenyl-propan-1-one, commercially available from Ciba Specialty Chemicals under the trade designation "Darocur 1173" as well as other photoinitiators commercially available from Ciba Specialty Chemicals under the trade designations "Darocur 4265", "Irgacure 651", "Irgacure 1800", "Irgacure 369", "Irgacure 1700", and "Irgacure 907".

The photoinitiator can be used at a concentration of about 0.1 to about 10 weight percent. More preferably, the photoinitiator is used at a concentration of about 0.5 to about 5 wt-%. Greater than 5 wt-% is generally disadvantageous in view of the tendency to cause yellow discoloration of the brightness enhancing film. Other photoinitiators and photoinitiator may also suitably be employed as may be determined by one of ordinary skill in the art.

Surfactants such as fluorosurfactants and silicone based surfactants can optionally be included in the polymerizable composition to reduce surface tension, improve wetting, allow smoother coating and fewer defects of the coating, etc.

Surface modified (e.g. colloidal) nanoparticles can be present in the polymerized structure in an amount effective to enhance the durability and/or refractive index of the article or optical element. In some embodiments, the total amount of surface modified inorganic nanoparticles can be present in the polymerizable resin or optical article in an amount of at least 10 wt-%, 20 wt-%, 30 wt-% or 40 wt-%. The concentration is typically less than to 70 wt-%, and more typically less than 60 wt-% in order that the polymerizable resin composition has a suitable viscosity for use in cast and cure processes of making microstructured films.

The size of such particles is chosen to avoid significant visible light scattering. It may be desirable to employ a mixture of inorganic oxide particle types to optimize an optical or material property and to lower total composition cost. The surface modified colloidal nanoparticles can be oxide particles having a (e.g. unassociated) primary particle size or associated particle size of greater than 1 nm, 5 nm or 10 nm. The primary or associated particle size is generally and less than 100 nm, 75 nm, or 50 nm. Typically the primary or associated particle size is less than 40 nm, 30 nm, or 20 nm. It is preferred that the nanoparticles are unassociated. Their measurements can be based on transmission electron microscopy (TEM). The nanoparticles can include metal oxides such as, for example, alumina, zirconia, titania, mixtures thereof, or mixed oxides thereof. Surface modified colloidal nanoparticles can be substantially fully condensed.

Fully condensed nanoparticles (with the exception of silica) typically have a degree of crystallinity (measured as isolated metal oxide particles) greater than 55%, preferably greater than 60%, and more preferably greater than 70%. For example, the degree of crystallinity can range up to about 86% or greater. The degree of crystallinity can be determined by X-ray diffraction techniques. Condensed crystalline (e.g. zirconia) nanoparticles have a high refractive index whereas amorphous nanoparticles typically have a lower refractive index.

Zirconia and titania nanoparticles can have a particle size from 5 to 50 nm, or 5 to 15 nm, or 8 nm to 12 nm. Zirconia nanoparticles can be present in the durable article or optical element in an amount from 10 to 70 wt-%, or 30 to 60 wt-%. Zirconias for use in composition and articles of the invention are available from Nalco Chemical Co. under the trade designation "Nalco OOSSOO8" and from Buhler AG Uzwil, Switzerland under the trade designation "Buhler zirconia Z-WO sol".

The zirconia particles can be prepared using hydrothermal technology as described in U.S. Pat. No. 7,241,437. The nanoparticles are surface modified. Surface modification involves attaching surface modification agents to inorganic oxide (e.g. zirconia) particles to modify the surface characteristics. The overall objective of the surface modification of the inorganic particles is to provide resins with homogeneous components and preferably a low viscosity that can be prepared into films (e.g. using cast and cure processes) with high brightness.

The nanoparticles are often surface-modified to improve compatibility with the organic matrix material. The surface-modified nanoparticles are often non-associated, non-agglomerated, or a combination thereof in an organic matrix material. The resulting light management films that contain these surface-modified nanoparticles tend to have high optical clarity and low haze. (See for example WO2007/059228 and WO2008/121465; incorporated herein by reference)

A common way of measuring the effectiveness of such recycling of light is to measure the gain of an optical film. As used herein, "relative gain", is defined as the on-axis luminance, as measured by the test method described in the examples, when an optical film (or optical film assembly) is placed on top of the light box, relative to the on-axis luminance measured when no optical film is present on top of the light box. This definition can be summarized by the following relationship:

Relative Gain=(Luminance measured with optical film)/(Luminance measured without optical film)

As described in U.S. Pat. No. 5,183,597 (Lu) and U.S. Pat. No. 5,175,030 (Lu et al.), a microstructure-bearing article (e.g. brightness enhancing film) can be prepared by a casting and curing method. Such method includes the steps of filling the (e.g. microprismatic) cavities of a master negative microstructured molding surface and curing the composition between a preformed (e.g. optically transparent) base and the master. The master can be metallic, such as nickel, nickel-plated copper or brass, or can be a thermoplastic material that is stable under the polymerization conditions, and that preferably has a surface energy that allows clean removal of the polymerized material from the master. One or more the surfaces of the base film can optionally be primed or otherwise be treated to promote adhesion of the optical layer to the base.

Brightness enhancing films generally enhance on-axis luminance (referred herein as "brightness") of a lighting device. Brightness enhancing films can be light transmissible, microstructured films. The microstructured topography can be a plurality of prisms on the film surface such that the films can be used to redirect light through reflection and refraction. The height of the prisms typically ranges from about 1 to about 75 microns. When used in an optical display such as that found in laptop computers, watches, etc., the microstructured optical film can increase brightness of an optical display by limiting light escaping from the display to within a pair of planes disposed at desired angles from a normal axis running through the optical display. As a result, light that would exit the display outside of the allowable range is reflected back into the display where a portion of it can be "recycled" and returned back to the microstructured film at an angle that allows it to escape from the display. The recycling is useful because it can reduce power consumption needed to provide a display with a desired level of brightness.

The brightness enhancing film of the invention generally comprises a (e.g. preformed polymeric film) base layer and an optical layer. The optical layer comprises a linear array of regular right prisms. Each prism has a first facet and a second facet. The prisms are formed on base that has a first surface on which the prisms are formed and a second surface that is substantially flat or planar and opposite first surface. By right prisms it is meant that the apex angle is typically about 90°. However, this angle can range from 70° to 120° and may range from 80° to 100°. These apexes can be sharp, rounded or flattened or truncated. For example, the ridges can be rounded to a radius in a range of 4 to 7 to 15 micrometers. The spacing between prism peaks (or pitch) can be 5 to 300 microns. For thin brightness enhancing films, the pitch is preferably 10 to 36 microns, and more preferably 18 to 24 microns. This corresponds to prism heights of preferably about 5 to 18 microns, and more preferably about 9 to 12 microns. The prism facets need not be identical, and the prisms may be tilted with respect to each other. The relationship between the total thickness of the optical article, and the height of the prisms, may vary. However, it is typically desirable to use relatively thinner optical layers with well-defined prism facets. For thin brightness enhancing films on substrates with thicknesses close to 1 mil (20-35 microns), a typical ratio of prism height to total thickness is generally between 0.2 and 0.4.

The microstructured optical layer can have a variety of useful patterns such as described and shown in U.S. Pat. No. 7,074,463; incorporated herein by reference. These include regular or irregular prismatic patterns can be an annular prismatic pattern, a cube-corner pattern or any other lenticular microstructure. A useful microstructure is a regular prismatic pattern that can act as a totally internal reflecting film for use as a brightness enhancement film. Another useful microstructure is a corner-cube prismatic pattern that can act as a retroreflecting film or element for use as reflecting film. Another useful microstructure is a prismatic pattern that can act as an optical turning film or element for use in an optical display.

Depending on the product, the preformed polymeric base layer can have a thickness ranging up to about 15 mils. The preformed polymeric film typically has a thickness of at least 0.5 mils (e.g. 0.6 mils, 0.7 mils, 0.8 mils, 0.9 mils). In some embodiments, the thickness is no greater than about 3 mils. In some embodiments, the film thickness ranges from about 1 mil to 2 mils.

Useful polymeric film materials include, for example, styrene-acrylonitrile, cellulose acetate butyrate, cellulose acetate propionate, cellulose triacetate, polyether sulfone, polymethyl methacrylate, polyurethane, polyester, polycarbonate, polyvinyl chloride, polystyrene, polyethylene naphthalate, copolymers or blends based on naphthalene dicarboxylic acids, polycyclo-olefins, and polyimides. Optionally, the base material can contain mixtures or combinations of these materials. In an embodiment, the base may be multi-layered or may contain a dispersed component suspended or dispersed in a continuous phase.

For some optical products such as brightness enhancement films, preferred preformed polymeric films include polyethylene terephthalate (PET) and polycarbonate. Examples of useful PET films include photograde polyethylene terephthalate and MELINEX™ PET available from DuPont Films of Wilmington, Del.

Some preformed film materials can be optically active, and can act as polarizing materials. A number of bases, also referred to herein as films or substrates, are known in the optical product art to be useful as polarizing materials. Polarization of light through a film can be accomplished, for example, by the inclusion of dichroic polarizers in a film material that selectively absorbs passing light. Light polarization can also be achieved by including inorganic materials such as aligned mica chips or by a discontinuous phase dispersed within a continuous film, such as droplets of light modulating liquid crystals dispersed within a continuous film. As an alternative, a film can be prepared from microfine layers of different materials. The polarizing materials within the film can be aligned into a polarizing orientation, for example, by employing methods such as stretching the film, applying electric or magnetic fields, and coating techniques.

Examples of polarizing films include those described in U.S. Pat. Nos. 5,825,543 and 5,783,120. The use of these polarizer films in combination with a brightness enhancement film has been described in U.S. Pat. No. 6,111,696. A second example of a polarizing film that can be used as a base are those films described in U.S. Pat. No. 5,882,774. Films available commercially are the multilayer films sold under the trade designation DBEF (Dual Brightness Enhancement Film) from 3M. The use of such multilayer polarizing optical film in a brightness enhancement film has been described in U.S. Pat. No. 5,828,488.

One preferred optical film having a polymerized microstructured surface is a brightness enhancing film. Brightness enhancing films generally enhance on-axis luminance (referred herein as "brightness") of a lighting device. The microstructured topography can be a plurality of prisms on the film surface such that the films can be used to redirect light through reflection and refraction. The height of the prisms typically ranges from about 1 to about 75 microns. When used in an optical display such as that found in laptop computers, watches, etc., the microstructured optical film can increase brightness of an optical display by limiting light escaping from the display to within a pair of planes disposed at desired angles from a normal axis running through the optical display. As a result, light that would exit the display outside of the allowable range is reflected back into the display where a portion of it can be "recycled" and returned back to the microstructured film at an angle that allows it to escape from the display. The recycling is useful because it can reduce power consumption needed to provide a display with a desired level of brightness.

The microstructured optical layer of a brightness enhancing film generally comprises a plurality of parallel longitudinal ridges extending along a length or width of the film. These ridges can be formed from a plurality of prism apexes. Each prism has a first facet and a second facet. The prisms are formed on base that has a first surface on which the prisms are formed and a second surface that is substantially flat or planar and opposite first surface. By right prisms it is meant that the apex angle is typically about 90°. However, this angle can range from 70° to 120° and may range from 80° to 100°. These apexes can be sharp, rounded or flattened or truncated. For example, the ridges can be rounded to a radius in a range of 4 to 7 to 15 micrometers. The spacing between prism peaks (or pitch) can be 5 to 300 microns. The prisms can be arranged in various patterns such as described in U.S. Pat. No. 7,074,463; incorporated herein by reference.

For thin brightness enhancing films, the pitch is preferably 10 to 36 microns, and more preferably 18 to 24 microns. This corresponds to prism heights of preferably about 5 to 18 microns, and more preferably about 9 to 12 microns. The prism facets need not be identical, and the prisms may be tilted with respect to each other. The relationship between the total thickness of the optical article, and the height of the prisms, may vary. However, it is typically desirable to use relatively thinner optical layers with well-defined prism facets. For thin brightness enhancing films on substrates with thicknesses close to 1 mil (20-35 microns), a typical ratio of prism height to total thickness is generally between 0.2 and 0.4.

For the following defined terms, these definitions shall be applied, unless a different definition is given in the claims or elsewhere in this specification.

The term "microstructure" is used herein as defined and explained in U.S. Pat. No. 4,576,850. Thus, it means the configuration of a surface that depicts or characterizes the predetermined desired utilitarian purpose or function of the article having the microstructure. Discontinuities such as projections and indentations in the surface of said article will deviate in profile from the average center line drawn through the microstructure such that the sum of the areas embraced by the surface profile above the center line is equal to the sum of the areas below the line, said line being essentially parallel to the nominal surface (bearing the microstructure) of the article. The heights of said deviations will typically be about +/−0.005 to +/−750 microns, as measured by an optical or electron microscope, through a representative characteristic length of the surface, e.g., 1-30 cm. Said average center line can be plano, concave, convex, aspheric or combinations thereof. Articles where said deviations are of low order, e.g., from +/−0.005+/−0.1 or, preferably, +/−0.05 microns, and said deviations are of infrequent or minimal occurrence, i.e., the surface is free of any significant discontinuities, are those where the microstructure-bearing surface is an essentially "flat" or "smooth" surface, such articles being useful, for example, as precision optical elements or elements with a precision optical interface, such as ophthalmic lenses. Articles where said deviations are of low order and of frequent occurrence include those having anti-reflective microstructure. Articles where said deviations are of high-order, e.g., from +/−0.1 to +/−750 microns, and attributable to microstructure comprising a plurality of utilitarian discontinuities which are the same or different and spaced apart or contiguous in a random or ordered manner, are articles such as retroreflective cube-corner sheeting, linear Fresnel lenses, video discs and brightness enhancing films. The microstructure-bearing surface can contain utilitarian discontinuities of both said low and high orders. The microstructure-bearing surface may contain extraneous or non-utilitarian discontinuities so long as the amounts or types thereof do not significantly interfere with or adversely affect the predetermined desired utilities of said articles.

"Index of refraction," or "refractive index," refers to the absolute refractive index of a material (e.g., a monomer) that is understood to be the ratio of the speed of electromagnetic radiation in free space to the speed of the radiation in that material. The refractive index can be measured using known methods and is generally measured using an Abbe refractometer or Bausch and Lomb Refractometer (CAT No. 33.46.10) in the visible light region (available commercially, for example, from Fisher Instruments of Pittsburgh, Pa.). It is generally appreciated that the measured index of refraction can vary to some extent depending on the instrument.

"(Meth)acrylate" refers to both acrylate and methacrylate compounds.

The term "nanoparticles" is defined herein to mean particles (primary particles or associated primary particles) with a diameter less than about 100 nm.

"Surface modified colloidal nanoparticle" refers to nanoparticles each with a modified surface such that the nanoparticles provide a stable dispersion.

"Stable dispersion" is defined herein as a dispersion in which the colloidal nanoparticles do not agglomerate after standing for a period of time, such as about 24 hours, under ambient conditions—e.g. room temperature (about 20-22° C.), atmospheric pressure, and no extreme electromagnetic forces.

The recitation of numerical ranges by endpoints includes all numbers subsumed within that range (e.g. 1 to 5 includes 1, 1.5, 2, 2.75, 3, 3.80, 4, and 5).

As used in this specification and the appended claims, the singular forms "a", "an", and "the" include plural referents unless the content clearly dictates otherwise. Thus, for example, reference to a composition containing "a compound" includes a mixture of two or more compounds. As used in this specification and the appended claims, the term "or" is generally employed in its sense including "and/or" unless the content clearly dictates otherwise.

Unless otherwise indicated, all numbers expressing quantities of ingredients, measurement of properties and so forth used in the specification and claims are to be understood as being modified in all instances by the term "about."

The present invention should not be considered limited to the particular examples described herein, but rather should be understood to cover all aspects of the invention as fairly set out in the attached claims. Various modifications, equivalent processes, as well as numerous structures to which the present invention can be applicable will be readily apparent to those of skill in the art to which the present invention is directed upon review of the instant specification.

EXAMPLES

UVA-1 1,2-(4-benzoyl-3-hydroxyphenoxy)ethyl acrylate, purchased from Aldrich Chemical.
UVA-2 2,2-[3-(2H-benzotriazol-2-yl)-4-hydroxyphenyl] ethyl methacrylate, purchased from Aldrich Chemical.
CN120 Epoxy Acrylate, from Sartomer Company, Exton, Pa.; reported by Sartomer to have a viscosity of 2150 cps at 65° C., a refractive index of 1.5556, and a Tg of 60° C.
1-NOEA 2-(1-Napthyloxy)-1-Ethyl Acrylate (from U.S. Pat. No. 6,953,623) with a viscosity of about 50 cps at 25° C., and a refractive index of 1.585
NK Ester 9,9-Bis[4-(2-acryloyloxyethoxy)phenyl]fluorene, from Shin-Nakamura
A-BPEF Chemical Co., LTD in Wakayama City, Japan; reported to have a refractive index of 1.62, and is a solid at 25° C.
PTEA Phenylthioethyl Acrylate, from Cognis Corporation, Cincinnati, Ohio, with a viscosity of about 10 cps at 25° C., and a refractive index of 1.558
TO-2344 2-phenyl-phenyl acrylate from Toagosei Co., LTD, Tokyo, Japan; reported to have a viscosity of 90 cps at 25° C., a refractive index of 1.583, and a Tg of 66° C.
Darocur 4265 Photoinitiator blend of TPO and alpha-hydroxyketone, available from Ciba Specialty Chemicals, Tarrytown, N.Y.

The following polymerizable resin compositions were each mixed together thoroughly in an amber jar.

TABLE 1

Polymerizable Resin Compositions

| Material | 1 | 2 | 3 | 4 | 5 | 6 | 7 | 8 |
|---|---|---|---|---|---|---|---|---|
| UVA-1 | | | | 3 | | | | |
| UVA-2 | | | | | 3 | 5 | 5 | 5 |
| 1-NOEA | 30 | | | 30 | 30 | 30 | | |
| A-BPEF | | 70 | 72 | | | | 67 | 72 |
| TO-2344 | | | 28 | | | | | 28 |
| CN120 | 70 | | | 67 | 67 | 67 | | |
| PTEA | | 30 | | | | | 29 | |
| Darocur 4265 | 0.3 | 0.3 | 0.3 | 0.3 | 0.3 | 0.3 | 0.3 | 0.3 |

Optical Film Sample Preparation:

Brightness enhancing films samples were made using the polymerizable resin compositions above. About 3 grams of warm resin was applied to a 2 mil primed PET (polyester) film, available from DuPont under the trade designation "Melinex 623" and placed against a microreplicated tool with a 90/24 pattern similar to the commercially available Vikuiti TBEF-90/24. The PET, resin and tool were passed through a heated laminator set at approximately 150° F. to create a uniformly thick sample. The tool containing the film and coated resin sample was passed at 50 fpm through a Fusion UV processor containing two 600 W/in D-bulbs. The PET and cured resin were removed from the tool and cut into samples. Brightness by ET was measured. Color was measured in transmission mode. The samples were exposed to irradiation for 288 hours in an accelerated weathering device equipped with Phillips F40 50 U lamps, as described in U.S. Pat. No. 7,124,651. Color was measured again, and the final b* and change in b* was recorded.

Table 2, below, depicts the test results of the optical films. The Comparative films, which did not contain the (meth) acrylate monomer A, showed unacceptable yellowing after weathering. The Inventive Examples were low in non-polymerizable, non-acrylate materials, and surprisingly had excellent brightness gain good color stability.

TABLE 2

Brightness Enhancing Film Results

| Film | Resin | Resin Refractive Index | Resin Non-Acrylates | ET Gain Single Sheet | ET Gain Crossed Sheet | b* after weathering | b* change after weathering |
|---|---|---|---|---|---|---|---|
| Comp-1 | 1 | 1.57 | 0.3% | 1.64 | 2.61 | 11.5 | 10.4 |
| Comp-2 | 2 | 1.60 | 0.3% | 1.73 | 2.76 | 31.3 | 29.5 |
| Comp-3 | 3 | 1.61 | 0.3% | 1.72 | 2.85 | 6.2 | 3.8 |
| Ex-4 | 4 | 1.57 | 0.3% | 1.62 | 2.65 | 4.6 | 3.4 |
| Ex-5 | 5 | 1.57 | 0.3% | 1.64 | 2.65 | 3.1 | 1.9 |
| Ex-6 | 6 | 1.57 | 0.3% | 1.65 | 2.62 | 2.7 | 1.5 |
| Ex-7 | 7 | 1.60 | 0.3% | 1.73 | 2.80 | 1.7 | −0.4 |
| Ex-8 | 8 | 1.61 | 0.3% | 1.71 | 2.82 | 1.6 | −0.8 |

What is claimed is:

1. A microstructured film comprising a polymerized microstructured surface wherein the microstructures comprise the reaction product of a polymerizable resin composition comprising an organic portion having a refractive index of at least 1.56, the organic component comprising a di(meth) acrylate monomer that is a fluorene-containing monomer and at least one aromatic monofunctional (meth)acrylate monomer that comprises a group selected from phenyl or biphenyl.

2. The microstructured film of claim 1 wherein the mono (meth)acrylate monomer is a sulfur-containing aromatic monomer.

3. The microstructured film of claim 1 wherein the polymerizable resin is non-brominated.

4. The microstructured film of claim 1 wherein the polymerizable resin is non-halogenated.

5. The microstructured film of claim 1 wherein the polymerizable resin comprises at least one aromatic monomer or oligomer having a refractive index of least 1.585.

6. The microstructured film of claim 1 wherein the polymerizable resin comprises no greater than 1% by weight of non-polymerizable additives other than photoinitiator.

7. The microstructured film of claim 1 wherein the polymerizable resin further comprises inorganic particles.

8. The microstructured film of claim 1 wherein the inorganic particles comprises zirconia.

9. The microstructured film of claim 1 wherein the film is a brightness enhancing film.

10. The microstructured film of claim 1 wherein the polymerizable resin further comprises a polymerizable ultraviolet absorbing compound.

11. A microstructured film comprising a polymerized microstructured surface wherein the microstructures comprise the reaction product of a polymerizable resin composition comprising an organic portion having a refractive index of at least 1.59 wherein the polymerizable resin composition comprises a fluorene-containing monomer.

12. The microstructured film of claim 11 wherein the organic component comprises a di(meth)acrylate monomer that is a fluorene-containing monomer and at least one aromatic monofunctional (meth)acrylate monomer that comprises a group selected from phenyl or biphenyl.

13. The microstructured film of claim 11 wherein the polymerizable resin is non-brominated.

14. The microstructured film of claim 11 wherein the polymerizable resin comprises at least one aromatic monomer or oligomer having a refractive index of least 1.585.

15. The microstructured film of claim 11 wherein the polymerizable resin further comprises a polymerizable ultraviolet absorbing compound.

16. A microstructured film comprising a polymerized microstructured surface wherein the microstructures comprise the reaction product of a polymerizable resin composition comprising an organic portion having a refractive index of at least 1.56 and a viscosity of less than 1000 cps at 25° C. wherein the polymerizable resin composition comprises a fluorene-containing monomer.

17. The microstructured film of claim 16 wherein the organic component comprises a di(meth)acrylate monomer that is a fluorene-containing monomer and at least one aromatic monofunctional (meth)acrylate monomer that comprises a group selected from phenyl or biphenyl.

18. The microstructured film of claim 16 wherein the polymerizable resin is non-brominated.

19. The microstructured film of claim 16 wherein the polymerizable resin comprises at least one aromatic monomer or oligomer having a refractive index of least 1.585.

20. The microstructured film of claim 16 wherein the polymerizable resin further comprises a polymerizable ultraviolet absorbing compound.

* * * * *